United States Patent [19]

EerNisse et al.

[11] Patent Number: 4,526,247
[45] Date of Patent: Jul. 2, 1985

[54] WEIGHING SCALE TRANSDUCER

[75] Inventors: Errol P. EerNisse, Sandy; Mark D. Gaiser, Salt Lake City, both of Utah; John P. Hanley, West Paterson, N.J.; Walter P. Kistler; Jerome M. Paros, both of Redmond, Wash.; Robert B. Wiggins, West Valley City, Utah

[73] Assignee: Ohaus Scale Corporation, Florham Park, N.J.

[21] Appl. No.: 458,887

[22] Filed: Jan. 18, 1983

[51] Int. Cl.³ .................. G01G 3/14; G01G 21/10; G01G 3/08; G01L 1/10
[52] U.S. Cl. .................. 177/210 FP; 177/189; 177/229; 73/862.59
[58] Field of Search ............... 177/210 FP, 229, 211, 177/189; 73/862.41, 862.59

[56] References Cited

U.S. PATENT DOCUMENTS

| | | | |
|---|---|---|---|
| 3,274,828 | 9/1966 | Pulvari | 73/141 |
| 3,366,191 | 1/1968 | Reid et al. | 177/210 |
| 3,479,536 | 11/1969 | Norris | 310/8.5 |
| 3,529,470 | 9/1970 | Agar | 73/141 |
| 3,541,849 | 11/1970 | Corbett | 73/141 |
| 3,621,713 | 11/1971 | Wirth et al. | 73/141 A |
| 3,712,395 | 1/1973 | Streater et al. | 177/210 |
| 3,724,572 | 4/1973 | Saner | 177/210 |
| 3,863,497 | 2/1975 | van de Vaart et al. | 73/71.2 |
| 3,885,427 | 5/1975 | Melcher et al. | 73/141 R |
| 3,915,248 | 10/1975 | Paelian | 177/210 |
| 3,963,082 | 6/1976 | Meier | 177/210 |
| 4,043,190 | 8/1977 | Gallo | 73/141 R |
| 4,075,887 | 2/1978 | Gallo | 73/141 R |
| 4,088,014 | 5/1978 | Wirth et al. | 73/141 R |
| 4,143,727 | 3/1979 | Jacobson | 177/211 |
| 4,170,270 | 10/1979 | Sette et al. | 177/229 |
| 4,179,004 | 12/1979 | Ebbinge | 177/211 |
| 4,196,784 | 4/1980 | Suzuki et al. | 177/211 |
| 4,215,570 | 8/1980 | EerNisse | 73/141 R |
| 4,237,988 | 12/1980 | Blawert et al. | 177/189 |
| 4,239,088 | 12/1980 | Check et al. | 177/210 FP |
| 4,299,122 | 11/1981 | Ueda et al. | 73/862.59 |
| 4,300,648 | 11/1981 | Gallo et al. | 177/229 |
| 4,321,500 | 3/1982 | Paros et al. | 310/321 |
| 4,372,173 | 2/1983 | EerNisse et al. | 73/862.59 |
| 4,384,495 | 5/1983 | Paros | 73/862.59 |
| 4,497,386 | 2/1985 | Meier | 177/229 |

FOREIGN PATENT DOCUMENTS

0016238 10/1980 European Pat. Off. .
1322871 7/1973 United Kingdom .

Primary Examiner—George H. Miller, Jr.
Attorney, Agent, or Firm—Robert R. Jackson; David W. Plant

[57] ABSTRACT

A transducer system for a weighing scale having a flexure mode crystal resonator includes a parallelogram linkage for supporting the load platform of the scale, a mounting structure for mounting the crystal resonator between two pivotally connected mounting arms, and a coupling assembly for coupling force from the parallelogram linkage to one arm of the mounting structure.

22 Claims, 10 Drawing Figures

WEIGHING SCALE TRANSDUCER

BACKGROUND OF THE INVENTION

This invention relates to scales for measuring the weight of an object, and more particularly to transducers for converting the weight of an object into an electrical signal property indicative of the weight of the object.

Transducers including flexure mode piezoelectric crystal resonators have been developed which are capable of converting a force applied to the crystal resonator into an electrical signal property representative of the applied force. One such resonator is shown in EerNisse U.S. Pat. No. 4,215,570 entitled "Miniature Quartz Resonator Force Transducer". "Flexure mode" refers to the particular mode of oscillation of the resonator. This mode is characterized by oscillatory flexural bending of relatively long, slender crystal members. Resonators having this mode of oscillation are typically relatively delicate structures which are prone to break is subjected to mechanical shock or to loading which applies any significant bending, torsion, or shear force to the resonator member. The resonator is strongest and most accurate when loaded as a column in pure tension or compression.

The flexure mode crystal resonator need not be piezoelectric, but may alternatively be a non-piezoelectric crystal structure (e.g., a silicon crystal) driven in the flexure mode by piezoelectric material (e.g., zinc oxide) associated with the crystal. Although in the preferred embodiment of the present invention the resonator is a piezoelectric crystal, it will be understood that the term "flexure mode crystal resonator" as used herein and in the appended claims includes both flexure mode piezoelectric crystal resonators and piezoelectrically driven flexure mode crystal resonators.

A problem which is relatively unique to weighing scales is that the line of action of the force due to gravity of the object to be weighed cannot be predicted with certainty. Unlike devices such as pressure transducers and accelerometers in which the line of action of the force to be measured is always the same, the line of action of the force in a weighing scale depends on where the user places the object to be weighed on the load platform of the scale. It is of the utmost importance to the proper and satisfactory operation of a weighing scale that the indicated weight of the object not depend on its location on the load platform. In addition, in a scale employing a flexure mode crystal resonator of the type mentioned above, the resonator must be protected from the bending, torsion, or shear force components which typically result from off-center loading of the scale. These force components not only increase the risk of resonator breakage, they also subject the resonator to load components which reduce the accuracy of the transducer.

Others have developed weighing scale transducers including thickness shear mode (as distinguished from flexure mode) piezoelectric crystal resonators. The crystal resonators in those transducers were relatively large and robust quartz crystal discs about 1.5 cm in diameter (see, for example, Walker U.S. Pat. No. 4,130,624). These transducers included (1) two vertically spaced, substantially parallel flexure assemblies for supporting the load platform of the scale, (2) a thickness shear mode crystal resonator disc mounted for loading by a compression force applied at two diametrically opposite points on the edge of the disc, and (3) a coupling assembly for applying vertical force from the flexure assemblies to the edge of the resonator disc. The coupling assembly included pivotal bearings for preventing application of moments from the flexure assemblies to the resonator disc. The coupling assembly also included, between the pivotal bearings and the resonator disc, a second system of vertically spaced, substantially parallel flexure assemblies for insuring vertical alignment of the coupling assembly. In addition to the mechanical differences between those transducers and the transducers of the present invention, there was no suggestion in that work of employing much more fragile flexure mode crystal resonators or even of a structure capable of mounting such a flexure mode resonator.

In view of the foregoing, it is an object of this invention to provide a weighing scale transducer employing a flexure mode crystal resonator.

It is a more particular object of this invention to provide structures for assuring that the flexure mode crystal resonator element in a weighing scale of the type mentioned above is subject only to axial loading and is prevented from receiving any significant bending, torsion, or shear loading regardless of the location of the object to be weighed on the load platform of the scale.

SUMMARY OF THE INVENTION

These and other objects of the invention are accomplished in accordance with the principles of the invention by providing a weighing scale transducer in which the load platform is supported for vertical movement by two vertically spaced, substantially parallel flexure assemblies; a flexure mode crystal resonator is mounted between two pivotally connected arms of a mounting structure; and a coupler applies, from the flexure assemblies to the mounting structure, substantially only force aligned with the vertical axis. The flexure assemblies largely resolve into a vertical force any off-center loading of the load platform. The coupler further attenuates any non-vertical force components. And the mounting structure substantially absorbs any remaining non-vertical force components which are transmitted by the preceding elements so that the crystal resonator is highly insulated from such force components.

Further features of the invention, its nature and various advantages will be more apparent from the accompanying drawing and the following detailed description of the invention.

DETAILED DESCRIPTION OF THE INVENTION

Figure 1:
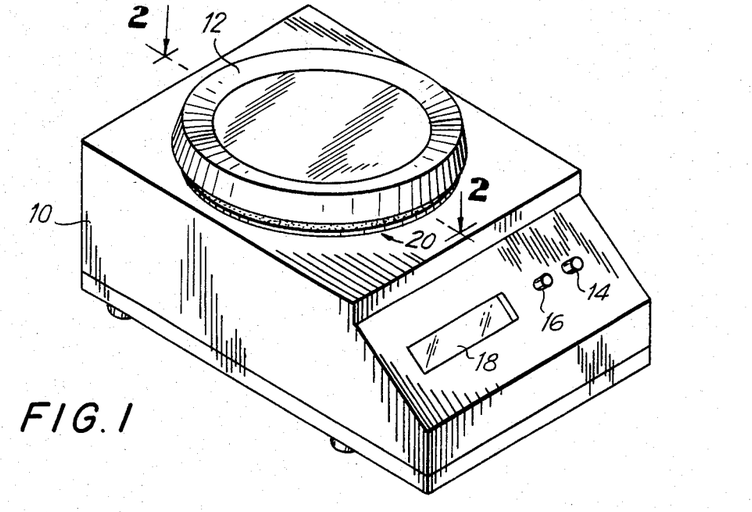
FIG. 1 is a perspective view of a weighing scale which may include the transducer of this invention.

A typical weighing scale which may include the transducer system of this invention is shown in FIG. 1. This scale includes a housing 10, a load platform 12 mounted for limited vertical movement above housing 10, control buttons 14 and 16 (e.g., an on/off control and a tare control), and an electronic digital display 18. The scale is turned on and tared, if necessary, by operation of controls 14 and 16. An object to be weighed is then placed anywhere on load platform 12, and the weight of the object is displayed by digital display 18. The particular scale shown in FIG. 1 is merely illustrative of the weighing scales in which the transducer system of this invention can be employed. Apart from the transducer system described in detail below, the construction and operation of the scale form no part of the present invention and can be conventional.

Figure 3:
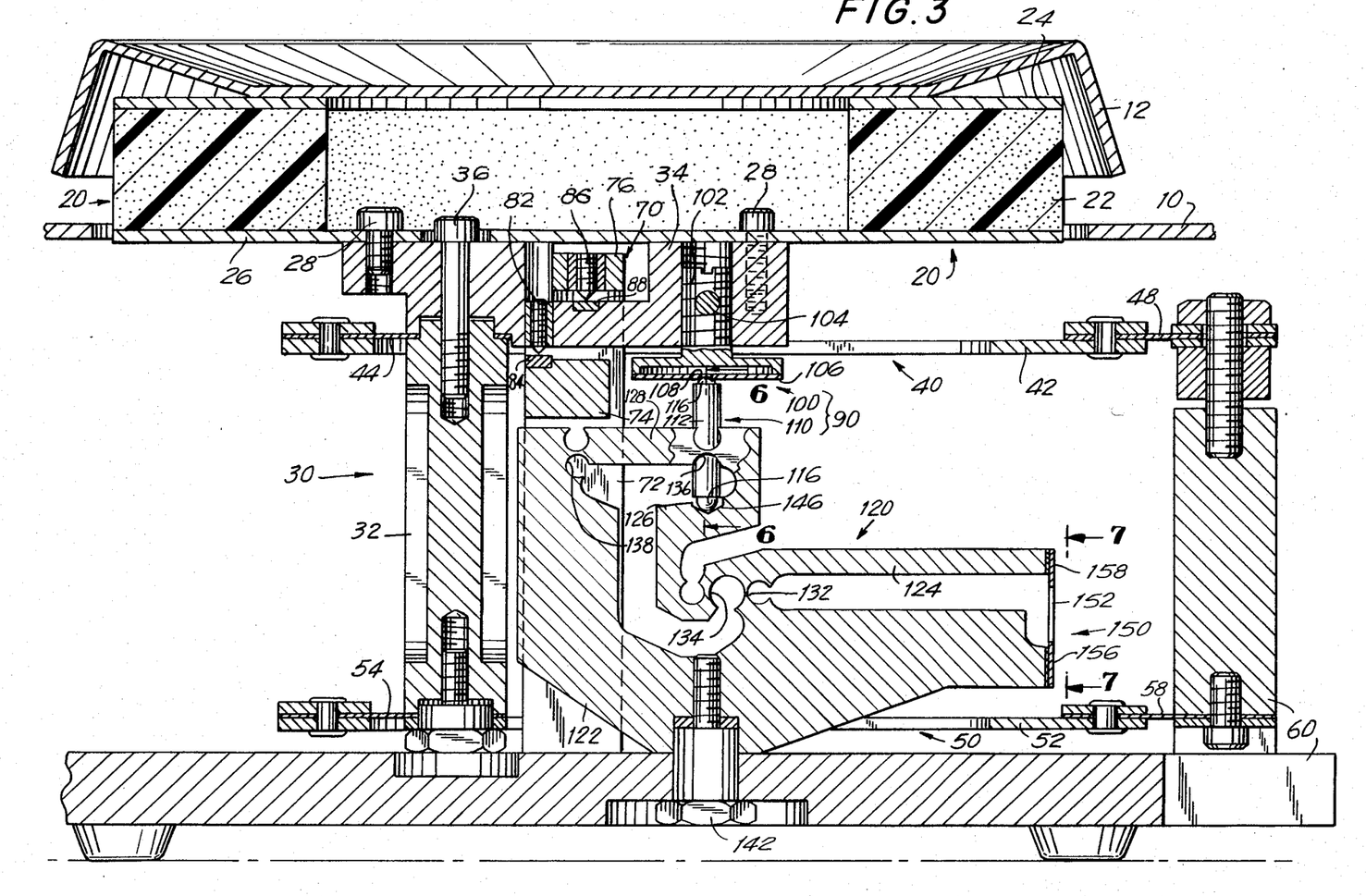
FIG. 3 is a sectional view taken along the line 3—3 in FIG. 2.
Figure 5:
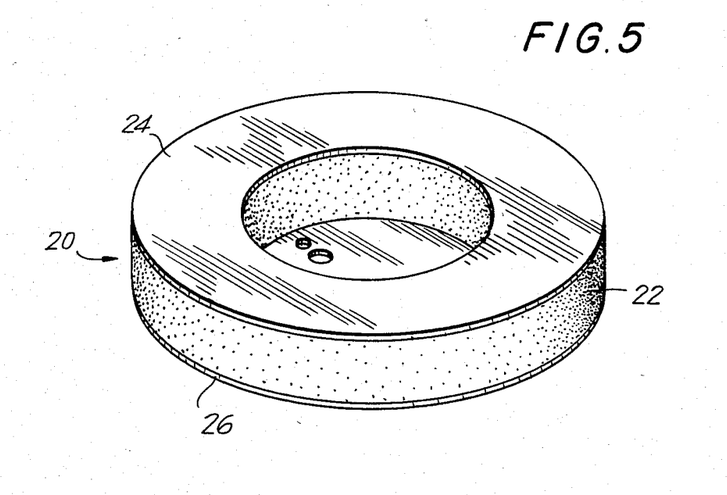
FIG. 5 is a perspective view of a portion of the apparatus of FIG. 3.

As best seen in FIG. 3, load platform 12 rests on a shock absorbing assembly 20, which includes an annulus of resilient shock absorbing material 22 (e.g., conventional high compression polyether urethane cellular foam) sandwiched between upper and lower metal subplatforms 24 and 26 (see also FIG. 5). The components of shock absorbing assembly 20 are held together by any suitable means such as an adhesive. Shock absorbing assembly 20 absorbs at least a major portion of any transient force which is suddenly applied to load platform 12 as the result, for example, of dropping an object on the platform.

Figure 2:
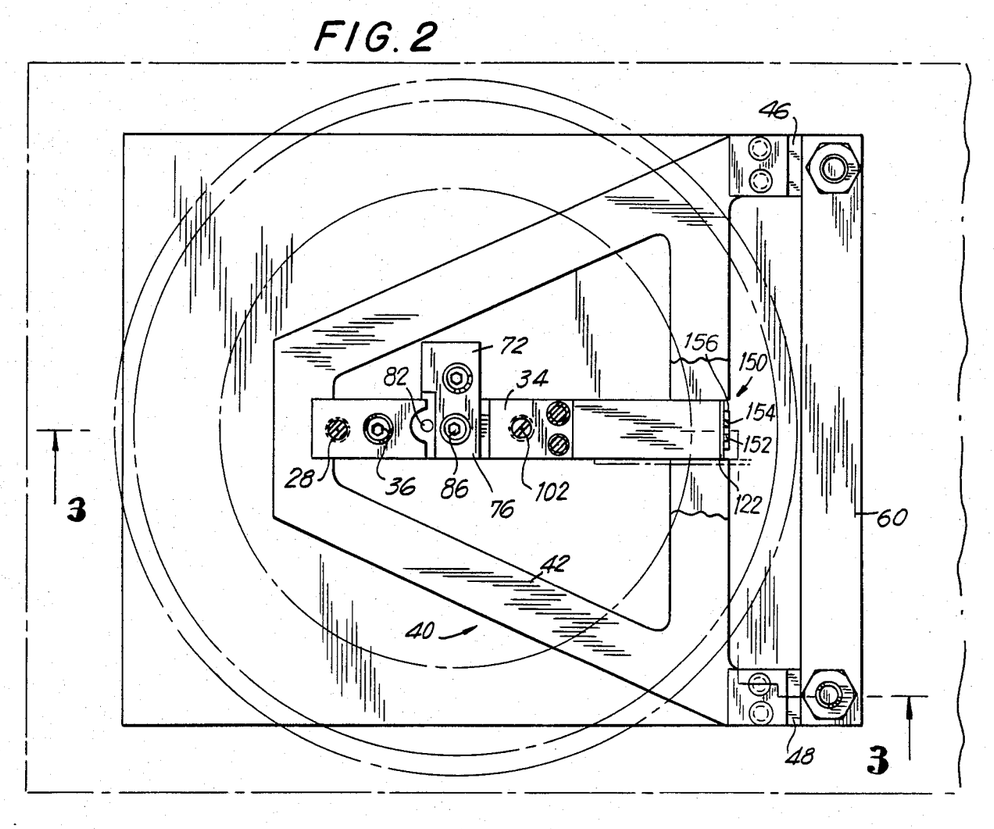
FIG. 2 is a top plan view of an illustrative embodiment of the transducer of this invention.

Lower subplatform 26 is connected to flexure arm post assembly 30 by screws 28. Post assembly 30 includes vertical post 32 and horizontal arm 34 which are held together by screw 36 (see also FIG. 4). Post assembly 30 is supported for limited vertical movement by upper and lower flexure arm assemblies 40 and 50 (see also FIGS. 2 and 4). Each flexure arm assembly includes a substantially rigid planar member 42, 52, which in plan view is substantially triangular. Each of members 42, 52 is connected, adjacent one of the vertices of its triangular periphery, to the upper or lower end of vertical post 32. Member 42 is thus connected to the upper end of post 32 by flexure 44, and member 52 is thus connected to the lower end of post 32 by flexure 54. Each of members 42, 52 is similarly connected adjacent its two remaining peripheral vertices to the fixed and rigid frame 60 of the scale. These connections are provided by flexures 46 and 48 in the case of member 42, and by flexures 56 and 58 in the case of member 52. Each of flexures 44, 46, 48, 54, 56, and 58 is a planar piece of resiliently flexible metal (e.g., beryllium copper). Each flexure is substantially coplanar with the associated rigid member 42, 52, and each flexure is flexible substantially only perpendicular to the plane of the rigid member. Accordingly, flexure assemblies 40 and 50, together with post assembly 30 and the vertical portion of base 60, comprise a parallelogram linkage which substantially constrains post assembly 30 to vertical movement in the plane of the paper in FIG. 3.

The two flexures on the fixed side of each of flexure assemblies 40 and 50 (i.e., flexures 46 and 48 in the case of assembly 40, and flexures 56 and 58 in the case of assembly 50) are horizontally spaced from one another by a sufficient distance to substantially prevent twisting of the parallelogram linkage (i.e., motion out of the plane of the paper in FIG. 3) in response to any off-center loading of load platform 12. The broad-based triangular shape of members 42 and 52 also contributes to the resistance of the parallelogram linkage to twisting due to off-center loading.

Although in the preferred embodiment shown in the drawing, flexure assemblies 40 and 50 are each attached to frame 60 by two horizontally spaced flexures, other mounting arrangements are possible and are within the scope of the invention. For example, one long continuous mounting flexure could be used for mounting each member 42, 52; or three or more horizontally spaced flexures could be used.

The amount of vertical movement permitted by post assembly 30 is preferably limited by stop assembly 70. This assembly includes stop support 72 mounted on scale frame 60 and having two transverse arms 74 and 76 which respectively project under and over a portion of horizontal arm 34. Arm 34 carries set screw 82, the lower end of which contacts stop surface 84 on arm 74 to limit downward travel of post assembly 30. Similarly, arm 76 carries set screw 86, the lower end of which contacts stop surface 88 on horizontal arm 34 to limit upward movement of post assembly 30. Stop assembly 70 prevents excessive force, due either to large mechanical shock or an overload applied to load platform 12, from being transmitted to the flexure mode crystal resonator described below.

The end of horizontal arm 34 remote from vertical post 32 is connected to coupling assembly 90. This assembly includes diaphragm element 100 and push rod element 110. Diaphragm element 100 includes adapter 102 which is threaded into the end portion of horizontal arm 34. Set screw 104 is used to lock adapter 102 in place in the desired position. The lower end of adapter 102 carries resilient metal diaphragm 106, which acts as a spring between post assembly 30 and push rod element 110 to allow greater vertical motion of post assembly 30 than is correspondingly produced in push rod element 110. This allows mechanical stop assembly 70 to be used for post assembly 30, even though the maximum operational displacement of the resonator crystal is very small (e.g., approximately 0.0002 inch). The spring effect produced by diaphragm 106 amplifies this resonator crystal displacement considerably so that the corresponding operational displacement of post assembly 30 may be ten times greater (e.g., approximately 0.002 to 0.003 inch). Mechanical stops can be set to control this amount of post assembly displacement.

Figure 6:
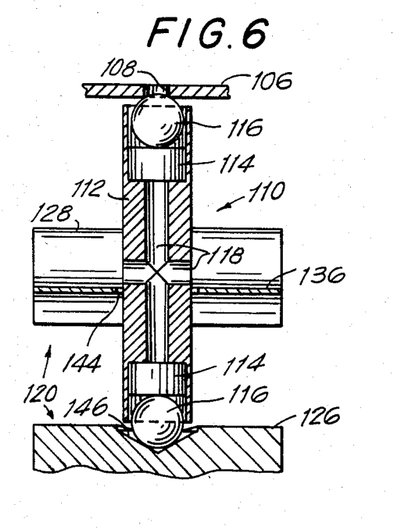
FIG. 6 is a sectional view taken along the line 6—6 in FIG. 3.

Diaphragm 106 has a centrally located aperture 108 for receiving and seating the upper end of push rod assembly 110 (see also FIG. 6). Push rod assembly 110 includes vertically aligned metal rod 112 having a socket in each end. A sapphire disc 114 is seated in the bottom of each aperture, and a stainless steel ball 116 is also contained in each socket so that the ball bears on the associated sapphire disc. A system of apertures 118 in rod 112 facilitates assembly of discs 114 in rod 112 by preventing entrapment of air behind discs 114. Coupling assembly 90, and especially push rod element 110, transmits force aligned with rod 112 from post assembly 30 to mounting structure 120 described below, but substantially prevents the transmission of any moments about balls 116. Discs 114 and balls 116 provide substantially frictionless pivotal bearings at each end of push rod element 110. Accordingly, coupling assembly 90 helps to further protect the crystal resonator from spurious force components.

The lower end of push rod element 110 bears on an interior portion of mounting structure 120. This structure is preferably an integral (i.e., one-piece) element of metal which includes several arms or bars pivotally connected together by flexural or "living" hinges in the material of the structure. Aluminum and beryllium copper are preferred materials for mounting structure 120. Although other configurations for the mounting structure are within the scope of the invention (several alternatives being shown in FIGS. 8-10), in the particular embodiment shown in FIGS. 2-4 mounting structure 120 is essentially a four bar linkage having four co-planar bars or arms 122, 124, 126, and 128 connected together in a closed circuit by flexural hinges 132, 134, 136, and 138. Arm 122 is rigidly mounted to scale base 60 by bolt 142. The portions of arm 122 to the left and right of bolt 142 as viewed in FIG. 3 are cantilevered above scale base 60. This cantilevering, especially the cantilevering of arm 122 to the right of flexural hinge 132 as viewed in FIG. 3, helps to insulate mounting structure 120 from spurious forces due, for example, to distortion of base 60. Arm 124 is pivotally connected to arm 122 by flexural hinge 132, which, like the other flexural hinges, is formed by milling out or boring out material on each side of the hinge to leave a thin strip or neck of material connecting arms 122 and 124. The pivotal axis of hinge 132, like the pivotal axes of all the other hinges, is perpendicular to the plane defined by the longitudinal axes of the arms joined by the hinge. The elastic limit of the flexural hinges is never exceeded during operation of the apparatus. Thus mounting structure 120 tends to resiliently return to its initial condition when whatever load has been placed on the scale is removed.

Continuing with the discussion of mounting structure 120, arm 124 is pivotally connected to arm 126 by flexural hinge 134. Arm 126 is pivotally connected to arm 128 by flexural hinge 136. And arm 128 is pivotally connected back to arm 122 by flexural hinge 138. Push rod element 110 passes freely through aperture 144 in flexural hinge 136, and the lower ball 116 of push rod element 110 seats in recess 146 in mounting structure arm 126.

The arrangement of elements in mounting structure 120 is such that when push rod element 110 moves vertically downward in response to the weight of an object on load platform 12, arm 126 also moves vertically downward. This causes arm 124 to pivot counterclockwise (as viewed in FIG. 3) about hinge 132. Arm 128 also pivots clockwise about hinge 138. Arm 122, of course, remains stationary at all times. The arms of mounting structure 120 in the embodiment of FIG. 3 are arranged in such a way that they effectively constitute a so-called Watt linkage. This means that for all operational movements of the elements in the linkage, the point at which the lower end of push rod element 110 bears on arm 126 is constrained to move only vertically. Arm 126 as a whole may pivot slightly about this point, but the motion of this point is linear (not arcuate) and vertical. This helps keep push rod element 110 vertically aligned at all times, which contributes to insulating the crystal resonator from spurious load components and to linearizing the response of the transducer to loads of various magnitudes.

Figure 7:
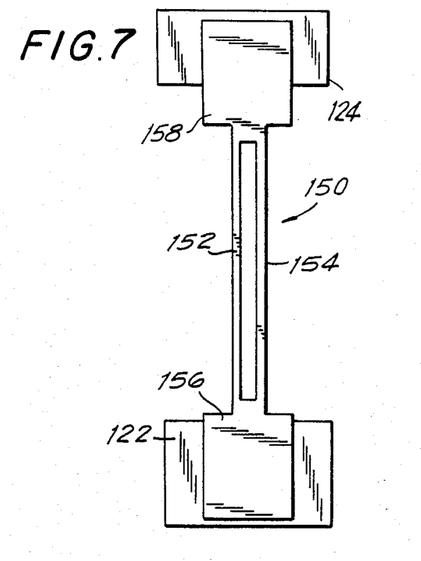
FIG. 7 is a partial elevational view taken along the line 7—7 in FIG. 3.

Arms 122 and 124 include portions which extend substantially parallel to one another (to the right of hinge 132 as viewed in FIG. 3) and which are vertically spaced apart. Flexure mode crystal resonator transducer 150 is mounted between the ends of arms 122 and 124 remote from hinge 132. Although other known flexure mode crystal resonator configurations are possible, a particularly preferred configuration is shown in the above-mentioned EerNisse U.S. Pat. No. 4,215,570. As shown in simplified form in FIG. 7, this type of resonator includes two laterally spaced, substantially parallel tines 152, 154 connected together at both ends by mounting tabs 156, 158. Typically, each tine is about 0.333 inch long, 0.008 inch thick, and 0.01 inch wide. Electrodes (not shown herein but shown in the EerNisse patent) are mounted on the surface of the crystal for coupling electrical signals to the resonator in the conventional manner. The tines of the resonator oscillate in the flexure mode in the plane of the paper in FIG. 7. Mounting tabs 156 and 158 are respectively attached to the ends of arms 122 and 124 by any suitable means such as an adhesive. Accordingly, when an object to be weighed is placed on load platform 12, flexure arm post assembly 30, coupling assembly 90, and mounting structure arm 126 all move vertically downward in response to the gravitational force on the object. This pivots mounting structure arm 124 counterclockwise, which places the tines 152, 154 of resonator 150 in tension. The tension force thus applied to the resonator tines is proportional to the weight of the object, and it produces a proportional change in the frequency of oscillation of the resonator tines and therefore in the electrical output signal of the transducer. The scale determines the weight of the object on the scale from this change in transducer output.

The use of relatively broad pivotal connections or hinges 132, 134, 136, and 138 between the arms of mounting structure 120 helps to stiffen mounting structure 120 with respect to deformations out of the plane of the paper in FIG. 3. (The "breadth" of the pivotal connections thus referred to is measured perpendicular to the plane of the paper in FIG. 3.) Mounting structure 120 therefore strongly resists any twisting deformations which would subject crystal resonator 150 to non-axial forces. As mentioned above, such non-axial forces reduce the accuracy of the transducer output and may also cause the relatively fragile crystal resonator to break. The above-described stiffness of mounting structure 120 is further enhanced by the use of a configuration including four hinges 132, 134, 136, and 138, all of which tend to reinforce one another to resist twisting deformation of the structure. The use of an integral mounting structure with flexural hinges further contributes to the ability of the structure to resist twisting deformation.

It should also be noted that coupling assembly 90 applies force to mounting structure 120 at a point which is longitudinally spaced from both hinge 132 and crystal resonator 150. This allows mounting structure 120 to be used as a lever arm assembly to reduce or amplify the force applied to crystal 150 as desired.

Although the arms in the mounting structure 120 described above are all substantially rigid, one or more arms in that structure may be made flexible in bending to a small degree if desired. In that event, resilient diaphragm 106 may be eliminated because the flexible mounting structure arm or arms will provide the function of allowing sufficiently large vertical motion of vertical post 32 to permit use of mechanical stops 82 and 86 to limit that motion.

Figure 4:
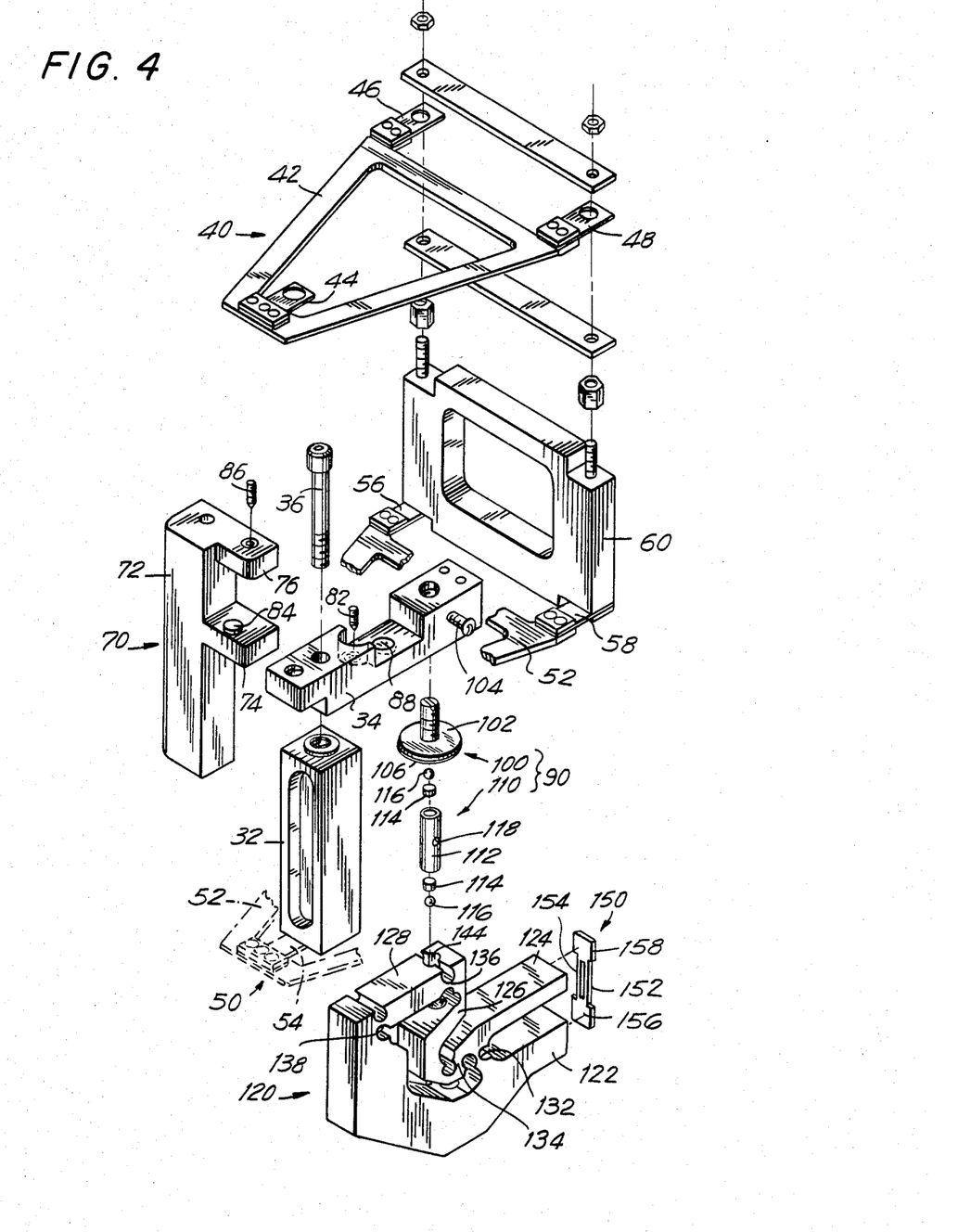
FIG. 4 is an exploded perspective view of the transducer of FIGS. 2 and 3.
Figure 8:
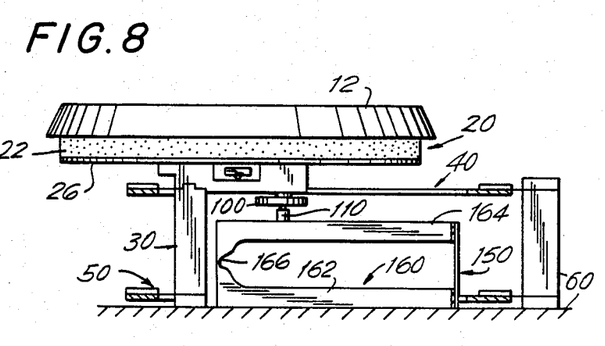
FIG. 8 is a simplified elevational view of an alternative embodiment of the transducer of this invention.

While the mounting structure configuration 120 shown in FIGS. 3 and 4 is especially preferred, other mounting structures can be alternatively employed in accordance with the principles of the invention. FIG. 8, for example, shows a transducer system similar to the one shown in FIGS. 2-7 but with an alternative mounting structure 160. This mounting structure includes two vertically spaced, substantially parallel arms 162 and 164 connected at one end by flexural hinge 166. As in the previously described embodiment, mounting structure 160 is preferably integral. Flexure mode crystal resonator 150 is mounted between the ends of arms 162 and 164 remote from hinge 166. Arm 162 is rigidly mounted on scale frame 60. The lower end of push rod element 110 bears on arm 164 at a point intermediate hinge 166 and transducer crystal 150. Accordingly, in this embodiment a load on platform 12 places crystal resonator 150 in compression. The load is measured by the resulting change in the electrical characteristics of crystal resonator 150.

Figure 9:
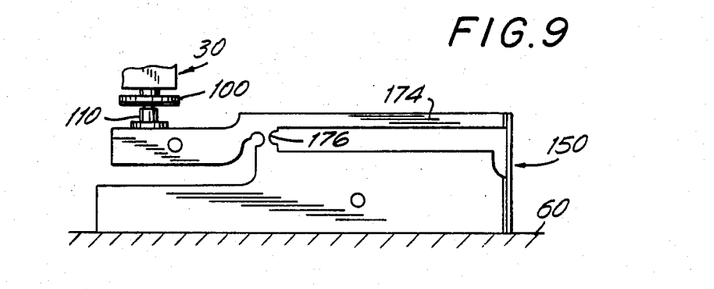
FIG. 9 is a simplified partial elevational view of another alternative embodiment of the transducer of this invention.

The alternative embodiment shown in FIG. 9 is similar to the embodiment of FIG. 8, except that mounting structure arm 174 extends beyond flexural hinge 176 in the direction away from flexure mode crystal resonator 150. The lower end of push rod element 110 bears on this extension of arm 174 so that a load on the scale places crystal resonator 150 in tension.

Figure 10:
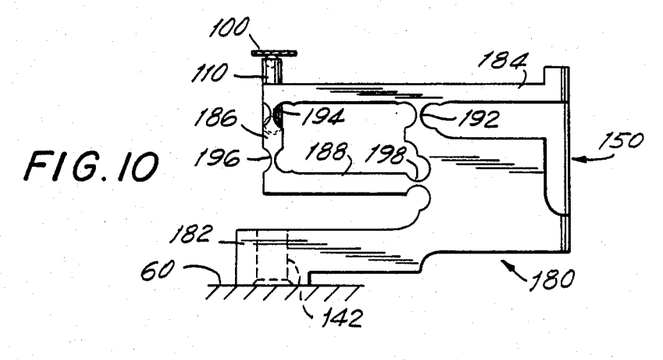
FIG. 10 is a simplified partial elevational view of yet another alternative embodiment of the transducer of this invention.

The alternative embodiment shown in FIG. 10 is again generally similar to the previously discussed embodiments, especially the embodiment of FIG. 9. In FIG. 10, however, mounting structure 180 is a four bar linkage including arms 182, 184, 186, and 188 connected in a circuit by flexural hinges 192, 194, 196, and 198. Arm 182 is the fixed arm attached to scale base 60 by bolt 142 and is cantilevered above base 60 to the right of bolt 142 as viewed in FIG. 10. As in the embodiment of FIGS. 2-7, cantilevering the major portion of mounting structure 180 above base 60 helps to insulate the mounting structure from spurious forces due to distortion of base 60. The mounting structure is loaded by the lower end of push rod element 110 which bears on an interior point near the middle of the length of bar 186. As in the mounting structure 120 shown in FIGS. 3 and 4, the use of four flexural hinges as shown in FIG. 10 helps increase the resistance of mounting structure 180 to twisting deformations (i.e., deformations out of the plane of the paper in FIG. 10).

It will be understand that the foregoing embodiments are only illustrative of the principles of the invention, and that various modifications can be made by those skilled in the art without departing from the scope and spirit of the invention. For example, parallelogram linkage 30, 40, 50, and 60 can include other types of flexure arm assemblies 30 and 40 as mentioned above.

We claim:

1. A transducer system for a weighing scale comprising:
   (A) a parallelogram flexure assembly including (1) upper and lower vertically spaced, substantially parallel flexure members, each having first and second horizontally spaced sides, the first side of each flexure member being mounted to a fixed mounting, and the second side of each flexure member being vertically movable, and (2) a vertical post member for connecting together the second sides of the flexure members and for supporting an object to be weighed;
   (B) a flexure mode crystal resonator transducer member; and
   (C) coupling means for transmitting vertical force from the flexure assembly to the crystal resonator member and including a mounting structure having first and second spaced arms, each arm having longitudinally spaced first and second portions, the first arm being fixed relative to the mountings of the flexure members, the arms being pivotally connected to one another adjacent the first portions by a pivotal connection having a pivotal axis perpendicular to the plane defined by the longitudinal axes of the arms, the crystal resonator member being mounted between the second portions of the arms, the first and second arms and pivotal connection of the mounting structure respectively comprising two bars and one pivotal connection of a four bar linkage, and the mounting structure further including the two additional bars and three additional pivotal connections of the four bar linkage.

2. The apparatus defined in claim 1 wherein the second arm is flexible between the point at which force is applied to it from the object to be weighed and the point at which the crystal resonator member is attached to the second arm.

3. The apparatus defined in claim 1 wherein the coupling means further includes means for applying the vertical force from the flexure assembly to the second arm at a point which is longitudinally spaced from both the second and second portions of the first arm.

4. The apparatus defined in claim 1 wherein the mounting structure is integral and wherein each of the pivotal connections of the arms is a flexural hinge in the material of the mounting structure.

5. The apparatus defined in claim 1 wherein the crystal resonator member includes two laterally spaced, substantially parallel tines connected together at both ends by mounting tabs, and wherein each mounting tab is bonded to the second portion of a respective one of the first and second arms.

6. The apparatus defined in claim 1 further comprising stop means for limiting the vertical movement of the post member before excessive force is applied to the crystal resonator member.

7. The apparatus defined in claim 1 wherein the coupling means further includes means for applying the vertical force from the flexure assembly to one of the additional bars of the four bar linkage to that force is applied to the crystal resonator member via the four bar linkage.

8. The apparatus defined in claim 7 wherein the mounting structure is integral and wherein the four pivotal connections are flexural hinges in the material of the mounting structure.

9. A transducer system for a weighing scale comprising:
   (A) a parallelogram flexure assembly including (1) upper and lower vertically spaced, substantially parallel flexure members, each having first and second horizontally spaced sides, the first side of each flexure member being mounted to a fixed mounting, and the second side of each flexure member being vertically movable , and (2) a vertical post member for connecting together the second sides of the flexure members and for supporting an object to be weighed;

(B) a flexure mode crystal resonator transducer member; and (C) coupling means for transmitting vertical force from the flexure assembly to the crystal resonator member, the coupling means including a resiliently compressible force transmitting element connected between the post member and the crystal resonator member for allowing greater displacement of the post member than is correspondingly produced in the crystal resonator member, the resiliently compressible force transmitting element being substantially unstressed in the absence of an object to be weighed.

10. A transducer system for a weighing scale comprising:

(A) a parallelogram flexure assembly including (1) upper and lower vertically spaced, substantially parallel flexure members. each having first and second horizontally spaced sides, the first side of each flexure member being mounted to a fixed mounting, and the second side of each flexure member being vertically movable, and (2) a vertical post member for connecting together the second sides of the flexure members and for supporting an object to be weighed;

(B) a flexure mode crystal resonator transducer member; and (C) coupling means for transmitting vertical force from the flexure assembly to the crystal resonator member, the coupling means including a pivotal bearing connection for transmitting force aligned with the vertical axis of the post member while substantially preventing transmission of moments about the bearing, the bearing connection including a vertically aligned rod and first and second ball bearings at each end of the rod.

11. The apparatus defined in claim 10 wherein each ball bearing is stainless steel and bears on a hardened surface having a relatively low coefficient of friction.

12. The apparatus defined in claim 11 wherein the surface on which each ball bearing bears is made of sapphire.

13. A transducer system for a weighing scale comprising:

(A) a parallelogram flexure assembly including (1) upper and lower vertically spaced, substantially parallel flexure members, each having first and second horizontally spaced sides, the first side of each flexure member being mounted to a fixed mounting, and the second side of each flexure member being vertically movable, and (2) a vertical post member for connecting together the second sides of the flexure members and for supporting an object to be weighed;

(B) a flexure mode crystal resonator transducer member;

(C) coupling means for transmitting vertical force from the flexure assembly to the crystal resonator member;

(D) a substantially horizontal platform for receiving the object to be weighed; and (E) shock absorbing means for connecting the platform to the post member and for substantially reducing the transmission of mechanical shocks from the platform to the post member, the shock absorbing means being substantially unstressed in the absence of an object to be weighed and being energy dissipating for substantially preventing oscillation of the platform relative to the post member.

14. The apparatus defined in claim 13 wherein the shock absorbing means comprises a resilient pad between the platform and the post member.

15. The apparatus defined in claim 14 wherein the resilient pad is a cellular foam.

16. The apparatus defined in claim 15 wherein the cellular foam is a polyether urethane foam.

17. A transducer system for a weighing scale comprising:

(A) a parallelogram flexure assembly including (1) upper and lower vertically spaced, substantially parallel flexure members, each having first and second horizontally spaced sides, the first side of each flexure member being mounted to a fixed mounting, and the second side of each flexure member being vertically movable, and (2) a vertical post member for connecting together the second sides of the flexure members and for supporting an object to be weighed;

(B) a flexure mode crystal resonator transducer member; and (C) coupling means for transmitting vertical force from the flexure assembly to the crystal resonator member, the coupling means including a mounting structure having first and second spaced arms, each arm having longitudinally spaced first and second portions, the first portion of the first arm being fixed relative to the mountings of the flexure members, the arms being pivotally connected to one another adjacent the first portions by a pivotal connection having a pivotal axis perpendicular to the plane defined by the longitudinal axes of the arms, the crystal resonator member being mounted between the second portions of the arms, and the second portion of the first arm to which the crystal resonator member is attached being cantilevered from the fixed mountings of the flexure members.

18. A transducer system for a weighing scale comprising:

(A) a fixed base;

(B) a substantially horizontal platform for receiving an object to be weighed;

(C) first and second vertically spaced, substantially parallel flexure members, each flexure member having horizontally spaced first and second sides, and each flexure member being pivotally mounted to the base along the first side of the flexure member;

(D) a vertical post for supporting the platform for limited vertical movement, the post being pivotally mounted to each flexure member along the second side of each flexure member, the pivotal axes of all of the pivotal mountings being substantially horizontal and mutually parallel;

(E) a mounting structure having first and second vertically spaced arms connected to one another by a first flexural hinge having a horizontal pivotal axis, the first arm being fixedly mounted on the base;

(F) a flexure mode crystal resonator transducer member connected between the first and second arms at a location which is laterally spaced from the pivotal axis of the first flexural hinge; and (G) coupling means for applying vertical force from the post to the second arm at a location which is laterally spaced from the pivotal axis of the first flexural hinge;

(H) the mounting structure further including third and fourth arms respectively connected to the first and second arms by second and third flexural hinges and connected to one another by a fourth flexural hinge, the pivotal axes of all of the flexural hinges being horizontal and parallel.

19. The apparatus defined in claim 17 wherein the coupling means applies vertical force from the post to the second arm via the fourth arm.

20. A mounting structure for applying substantially only tension or compression force to a crystal resonator transducer member comprising:
a fixed base;
first, second, third, and fourth co-planar arms, the first arm being fixedly attached to the base;
first, second, third, and fourth flexural hinges for respectively connecting together the first and second, the second and third, the third and fourth, and the fourth and first arms, the pivotal axes of all of the flexural hinges being substantially perpendicular to the plane defined by the arms;
a crystal resonator transducer member mounted between the first and second arms at a location which is laterally spaced from the pivotal axis of the first flexural hinge; and
means for applying force to one of the second, third, or fourth arms at a point which is laterally spaced from the pivotal axes of all of the flexural hinges, the force being applied in the plane defined by the arms, in order to place the transducer member in tension or compression.

21. The apparatus defined in claim 20 wherein at least one of the arms is flexible.

22. The apparatus defined in claim 20 wherein the first arm is fixedly attached to the base along only a first portion of its length, and wherein the remaining longitudinal portion or portions of the first arm are cantilevered from the first portion.

* * * * *

UNITED STATES PATENT AND TRADEMARK OFFICE
CERTIFICATE OF CORRECTION

PATENT NO. : 4,526,247

DATED : July 2, 1985

INVENTOR(S) : Errol P. EerNisse

It is certified that error appears in the above-identified patent and that said Letters Patent is hereby corrected as shown below:

| Column | Line | |
|--------|------|---|
| 1 | 21 | Change "is" to --if-- |
| 8 | 34 | Change "second" (first occurrence) to --first-- |
| 8 | 34 | Change "first" to --second-- |
| 11 | 9 | Change "17" to --18-- |

Signed and Sealed this

Twenty-ninth Day of October 1985

[SEAL]

Attest:

Attesting Officer

DONALD J. QUIGG

*Commissioner of Patents and Trademarks—Designate*